(12) United States Patent
Park (10) Patent No.: US 8,888,350 B2
(45) Date of Patent: Nov. 18, 2014

(54) LIGHT SOURCE ASSEMBLY AND BACKLIGHT ASSEMBLY HAVING THE SAME

(75) Inventor: Yong-Chang Park, Asan-si (KR)

(73) Assignee: Samsung Display Co., Ltd. (KR)

( * ) Notice: Subject to any disclaimer, the term of this patent is extended or adjusted under 35 U.S.C. 154(b) by 225 days.

(21) Appl. No.: 13/243,999

(22) Filed: Sep. 23, 2011

(65) Prior Publication Data

US 2012/0243258 A1  Sep. 27, 2012

(30) Foreign Application Priority Data

Mar. 22, 2011  (KR) .................. 10-2011-0025471

(51) Int. Cl.
| | | |
|---|---|---|
| *F21V 7/04* | (2006.01) | |
| *F21V 21/00* | (2006.01) | |
| *G09F 13/04* | (2006.01) | |
| *F21V 8/00* | (2006.01) | |

(52) U.S. Cl.
CPC ............... *F21V 21/00* (2013.01); *G02B 6/0073* (2013.01); *G02B 6/0031* (2013.01); *G02B 6/0068* (2013.01); *G09F 13/04* (2013.01)
USPC ...... 362/612; 362/613; 362/249.02; 362/631; 362/249.01

(58) Field of Classification Search
CPC .................................................... G02B 6/0068
USPC ................ 362/612, 249.01, 249.02, 613, 631
See application file for complete search history.

(56) References Cited

U.S. PATENT DOCUMENTS

| | | | |
|---|---|---|---|
| 7,036,946 B1 * | 5/2006 | Mosier | 362/27 |
| 7,553,060 B2 * | 6/2009 | Tanabe | 362/612 |
| 8,371,737 B2 * | 2/2013 | Wang | 362/612 |
| 8,434,924 B1 * | 5/2013 | Hamburgen et al. | 362/612 |
| 2009/0135625 A1 | 5/2009 | Yang et al. | |
| 2009/0185362 A1 * | 7/2009 | Hong et al. | 362/97.1 |
| 2012/0236592 A1 * | 9/2012 | Kang et al. | 362/609 |

FOREIGN PATENT DOCUMENTS

| | | |
|---|---|---|
| JP | 2006-319149 | 11/2006 |
| KR | 100897627 | 5/2009 |
| KR | 1020100012113 | 2/2010 |

* cited by examiner

*Primary Examiner* — Thomas M Sember
*Assistant Examiner* — Tsion Tumebo
(74) *Attorney, Agent, or Firm* — Innovation Counsel LLP (57) ABSTRACT

A light source assembly includes a first substrate, a plurality of first light source units mounted on the first substrate and spaced apart from each other by a first distance, a second substrate and a plurality of second light source units mounted on the second substrate and spaced apart from each other by a second distance, each of the second light source units being disposed between the first light source units adjacent to each other.

16 Claims, 11 Drawing Sheets

LIGHT SOURCE ASSEMBLY AND BACKLIGHT ASSEMBLY HAVING THE SAME

RELATED APPLICATIONS

This application claims priority under 35 U.S.C. §119 to Korean Patent Application No. 10-2011-0025471, filed on Mar. 22, 2011 in the Korean Intellectual Property Office (KIPO), the contents of which are herein incorporated by reference in its entirety.

BACKGROUND

1. Field of the Invention

Example embodiments of the disclosed subject matter relate to a light source assembly and a backlight assembly having the light source assembly. More particularly, example embodiments relate to a light source assembly for a display apparatus and a backlight assembly having the light source assembly.

2. Description of the Related Art

A liquid crystal display (LCD) apparatus may not emit light by itself, and thus an external light source supplying the light to an LCD panel is necessary. Most often a surface light source is used to apply the light to the LCD panel. In order to embody the surface light source, a linear light source or a point light source is used with various optical devices to emit the light.

Typically, the panel size is designed first. Then, a size of a light guide plate is decided according to the size of the panel, and finally a size of the light source assembly is decided according to the size of the light guide plate. Thus, the types of the light sources are limited by the size of the light source assembly or other design limitations of the light source assembly.

A longitudinal substrate on which a plurality of light emitting diodes (LEDs) is mounted is used to fabricate the light source assembly when the LED is used in the light source assembly. However, since each of the LEDs requires its own wirings for electrical supply, the wirings occupy a lot of space on the substrate for mounting the LED. Thus, the number of the mounted LEDs is limited by the wiring space, and the brightness may be decreased due to a decrease of the number of the LEDs mounted on the substrate.

SUMMARY

Example embodiments of the disclosed subject matter provide a light source assembly capable of enhancing the brightness and the brightness efficiency by changing a position of the LEDs with a changed substrate structure.

BRIEF DESCRIPTION OF THE DRAWINGS

FIG. 5 is a perspective view illustrating a portion of the light source assembly in FIG. 4a;

DETAILED DESCRIPTION

Figure 1:
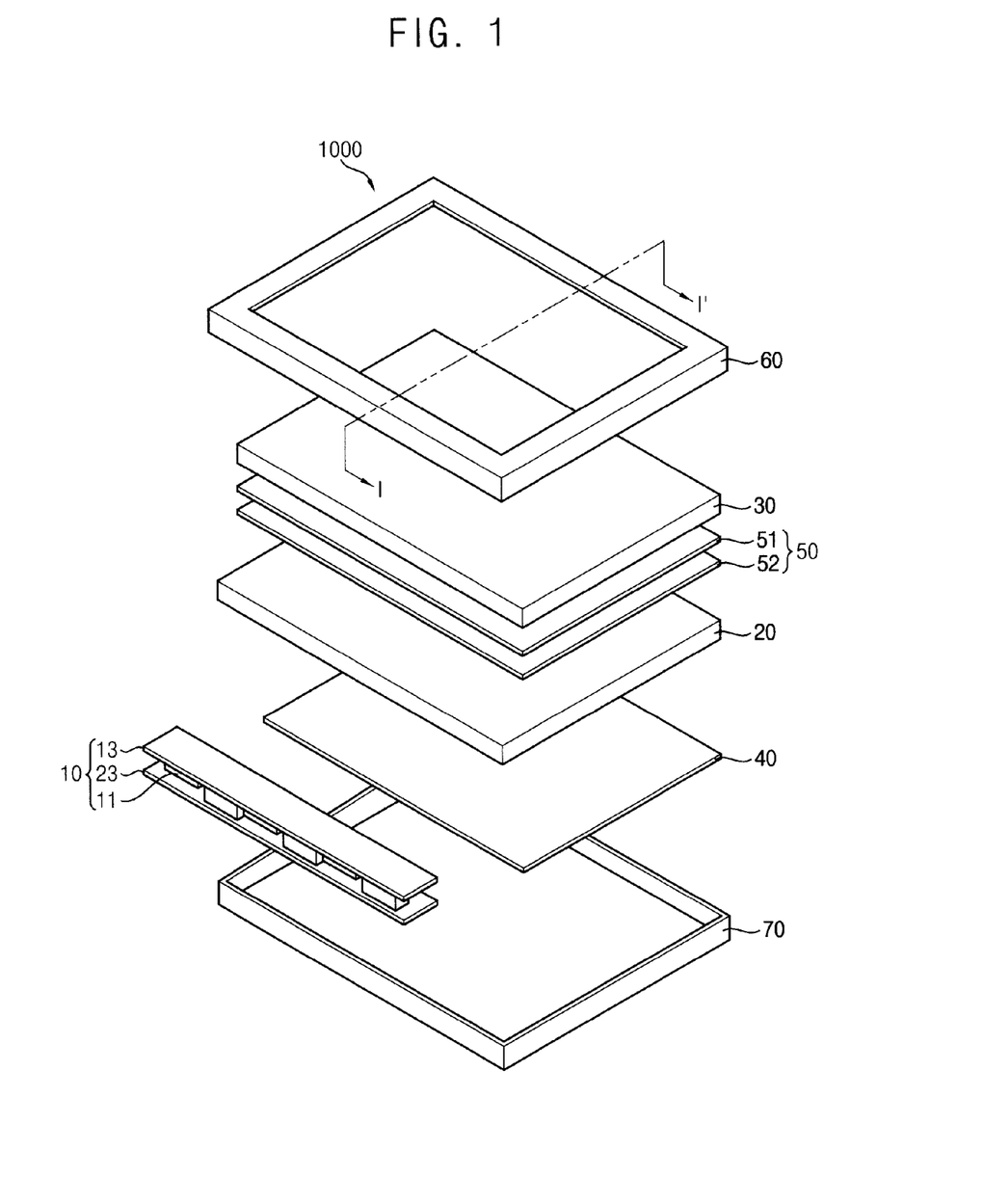
FIG. 1 is an exploded perspective view illustrating a display apparatus having a light source assembly according to an example embodiment.

FIG. 1 is an exploded perspective view illustrating a display apparatus having a light source assembly according to an example embodiment.

Referring to FIG. 1, a display apparatus 1000 according to one embodiment includes an upper mold 60, a display panel 30, an optical sheet 50, a light guide plate 20, a reflective plate 40, a light source assembly 10 and a lower mold 70. The light generated by the light source assembly 10 is guided toward the optical sheet 50 by the light guide plate 20 and the reflective plate 40. The optical sheet 50 may include a plurality of sheets 51 and 52. The light passing through the optical sheet 50 is guided toward the display panel 30, and the image is displayed on the display panel 30. The light source assembly 10 includes a first substrate 13, a second substrate 23 and a plurality of light source units 11.

Figure 2:
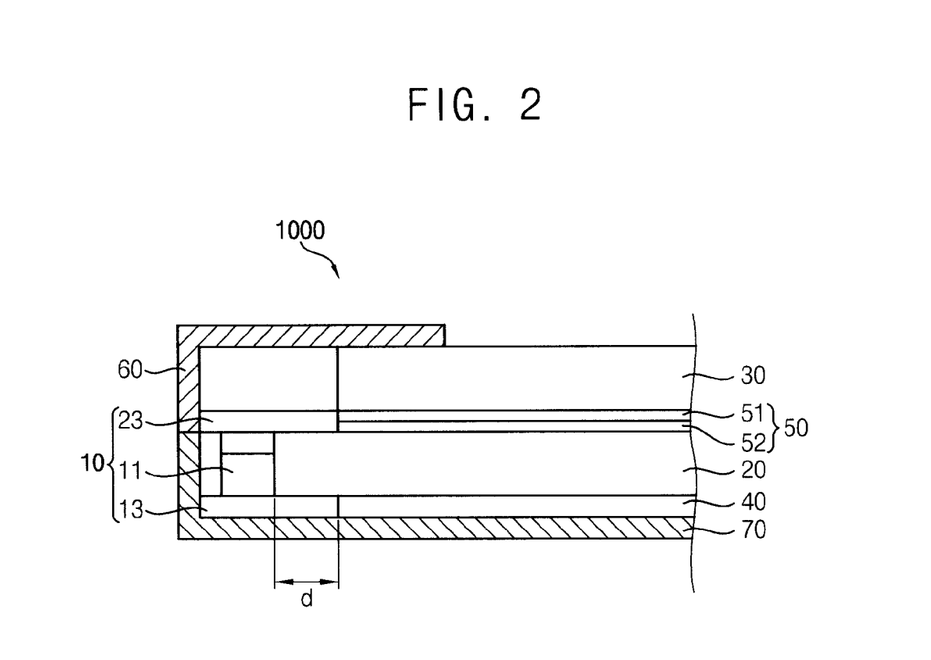
FIG. 2 is a cross-sectional view taken along a line I-I' in FIG. 1.

FIG. 2 is a cross-sectional view taken along a line I-I' in FIG. 1.

Referring to FIG. 2, a portion of the light guide plate 20 is surrounded and overlapped by the first and second substrates 13 and 23 of the light source assembly 10 by a predetermined width dimension, d. The light is not directly provided to the display panel 30 at the portion surrounded by the first substrate 13 and the second substrate 23. The surrounded portion determines a bezel width size of the display apparatus 1000. In the present example embodiment, the width dimension, d of the bezel is very small, and thus a small-sized display apparatus may be designed. The display apparatus 1000 including the first substrate 13 and the second substrate 23 has the width dimension, d of the bezel, which is substantially smaller than that of a conventional display apparatus.

Figure 3A:
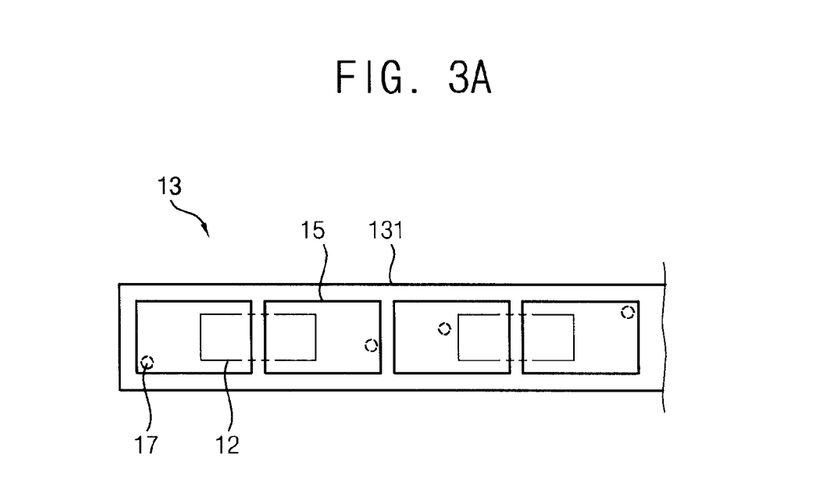
FIGS. 3A and 3B are plan views illustrating a substrate of the light source assembly in FIG. 2.
Figure 3B:
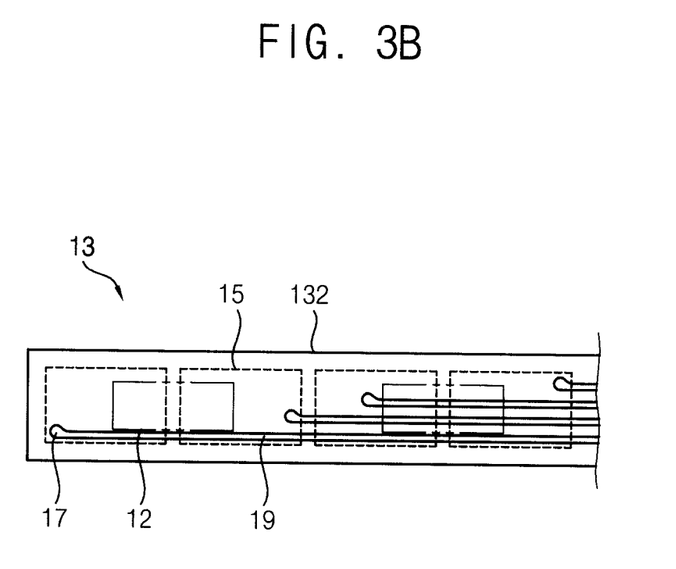

FIGS. 3A and 3B are plan views illustrating the substrate of the light source assembly in FIG. 2. FIG. 3A is a plan view illustrating a first surface 131 of the substrate 13. The FIG. 3B is a plan view illustrating a second surface 132.

The first substrate 13 in FIGS. 3A and 3B includes a first surface 131, a second surface 132 and a plurality of connecting parts 17. The first surface 131 includes a plurality of mounting areas 12 and a plurality of electrode pads 15. The mounting areas 12 are spaced apart from each other, and the light source units are respectively mounted on the mounting areas 12. The electrode pads 15 electrically make contact with the light source units and supply an electrical power to the light source units. The electrode pads 15 are extended toward the mounting areas 12 adjacent to the electrode pads 15, respectively.

Referring to FIG. 3B, the second surface 132 includes a plurality of wirings 19. The wirings 19 are formed in areas of the second surface 132 opposite to the mounting areas 12 of the first surfaces 131, since the connecting parts 17 in FIG. 3B are formed in peripheral areas of the mounting areas 12. For example, the connecting parts 17 may not be formed in the areas opposite to the mounting areas 12 in the conventional display apparatus. In the present example embodiment, the electrode pads 15 are widely formed on the first surface 131, and the connecting parts 17 are formed in the peripheral areas of the mounting areas 12. The wirings 19 may be formed on the second surface 132 corresponding to the mounting areas 12. Thus, the total width of the substrate 13 may be reduced.

Figure 4A:
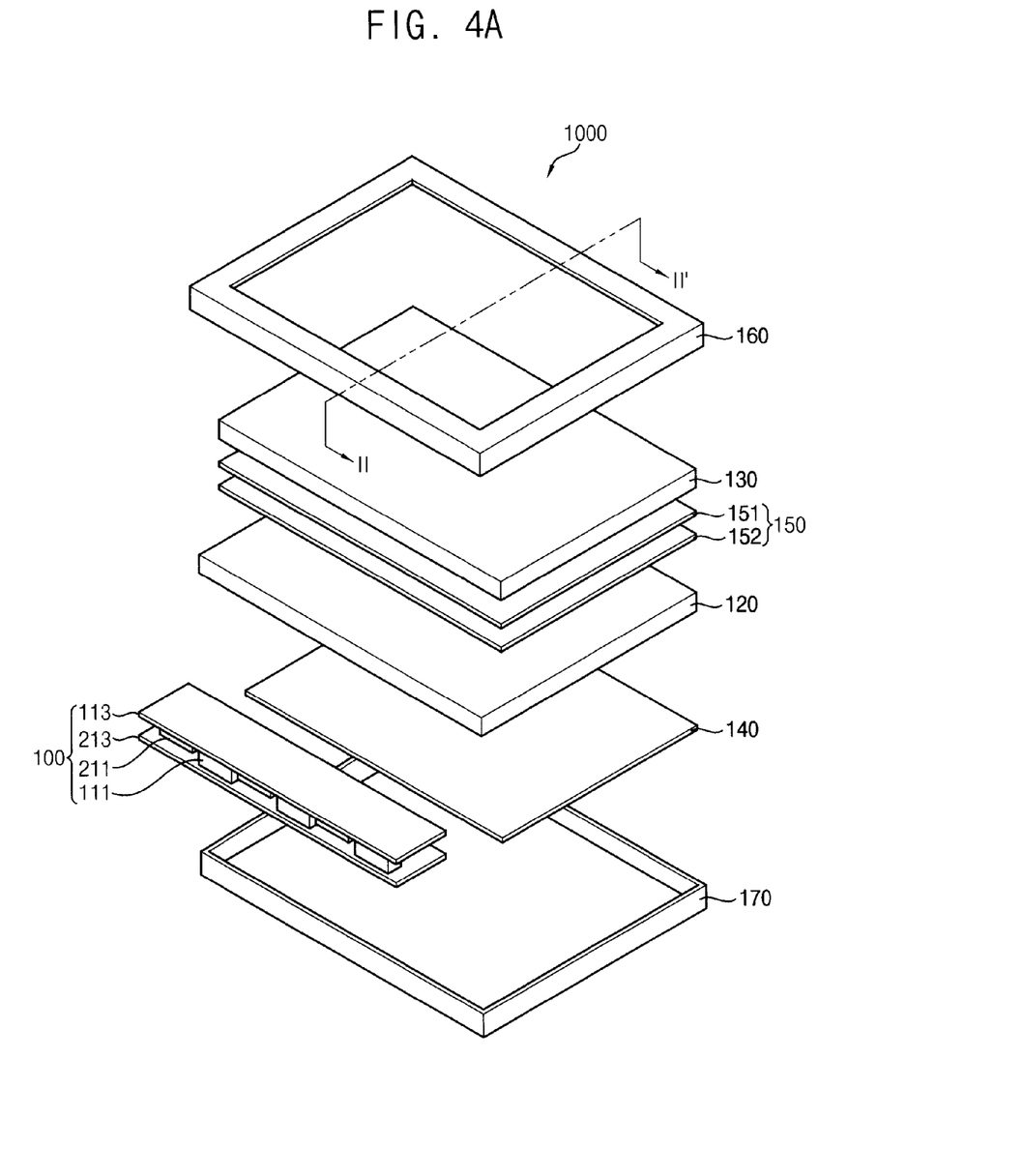
FIG. 4A is an exploded perspective view illustrating a display apparatus having a light source assembly according to another example embodiment.
Figure 4B:
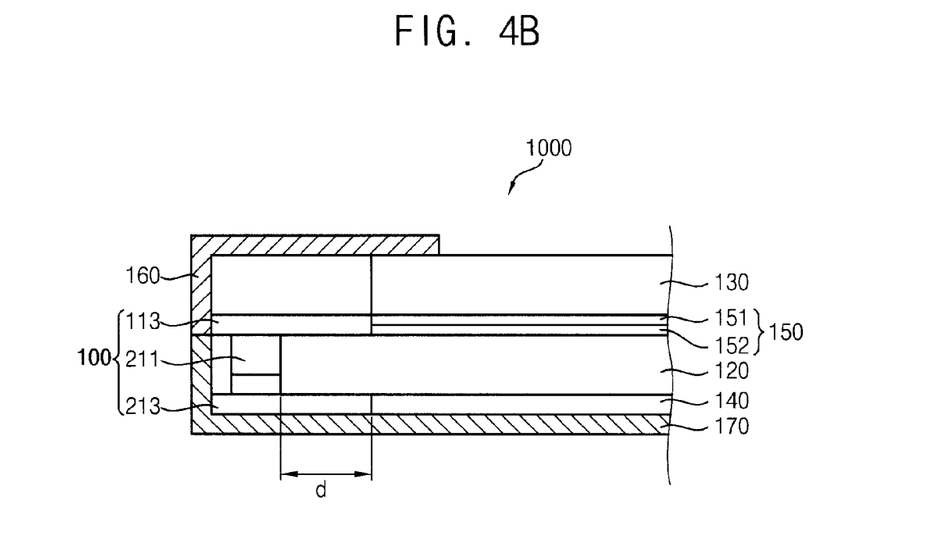
FIG. 4B is a cross-sectional view taken along a line II-IF in FIG. 4A.

FIG. 4A is an exploded perspective view illustrating a display apparatus having a light source assembly according to another example embodiment. FIG. 4B is a cross-sectional view taken along a line II-IF in FIG. 4A.

Referring to FIGS. 4A and 4B, the display apparatus according to the present embodiment includes an upper mold 160, a display panel 130, an optical sheet 150, a light guide plate 120, a reflective plate 140, a light source assembly 100 and a lower mold 170. The light generated by the light source assembly 100 is guided toward the display panel 130 by the light guide plate 120 and the reflective plate 140, and the image is displayed on the display panel 130. The light source assembly 100 includes first light source units 111, a first substrate 113, second light source units 211, and a second substrate 213.

Referring to FIG. 4B, a portion of the light guide plate 120 is surrounded by the first and second substrates 113 and 213 of the light source assembly 100 by a predetermined width d. The light is not directly provided to the display panel 130 at the portion surrounded by the first substrate 113 and the second substrate 213. The surrounded portion determines a depth of a bezel of the display apparatus. In the present example embodiment, the width d of the bezel is very small, and thus a small-sized display apparatus may be designed. The display apparatus 1000 including the first substrate 113 and the second substrate 213 has a width d of the bezel, which is substantially smaller than a conventional display apparatus.

Figure 5:
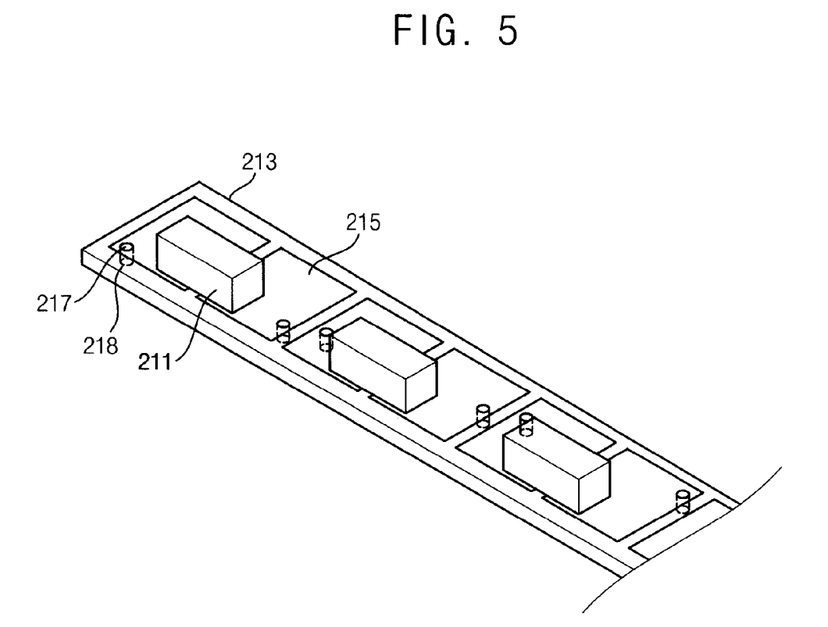

FIG. 5 is a perspective view illustrating a portion of the light source assembly in FIG. 4A.

The light source assembly 1000 in FIG. 4A includes the first substrate 113 and the second substrate 213. The first substrate 113 and the second substrate 213 overlaps with each other, and the first and second substrates 113 and 213 have substantially the same structure with each other. Thus, the repetitive description will be omitted.

A portion of the light source assembly 1000 in FIG. 5 includes a second substrate 213 and a plurality of second light source units 211. The second light source units 211 may include a light emitting diode (LED), and may include an LED package of a side-view type. With the LED package of the side-view type, light may be directly provided toward the light guide plate when the light source assembly 100 and the light guide plate 120 are combined with each other.

The second substrate 213 includes a plurality of electrode pads 215 and a plurality of connecting parts 217. The connecting parts 217 may include holes 218 passing through the substrate 213. The light source units 211 are respectively mounted on the electrode pads 215 of the second substrate 213 as described the above. The second light source units 211 are disposed at a constant interval, and thus the connecting parts 217 may be disposed at the peripheral areas of the electrode pads 215 that are disposed between the second light source units 211. The connecting parts 217 are generally formed larger than the width of wirings 219 formed on the opposite surface of the substrate. Spaces for the connecting parts 217 are needed for connecting the connecting parts with the wirings disposed on the opposite surface of the substrate. Only by disposing the wirings densely, the areas in which the wirings are formed may not be reduced. In the present example embodiment, the electrode pads 215 are extended to the peripheral areas of the second light source units 211, and the connecting parts 217 may be disposed in the peripheral areas. Thus, the width of the second substrate 213 may be reduced.

Figure 6A:
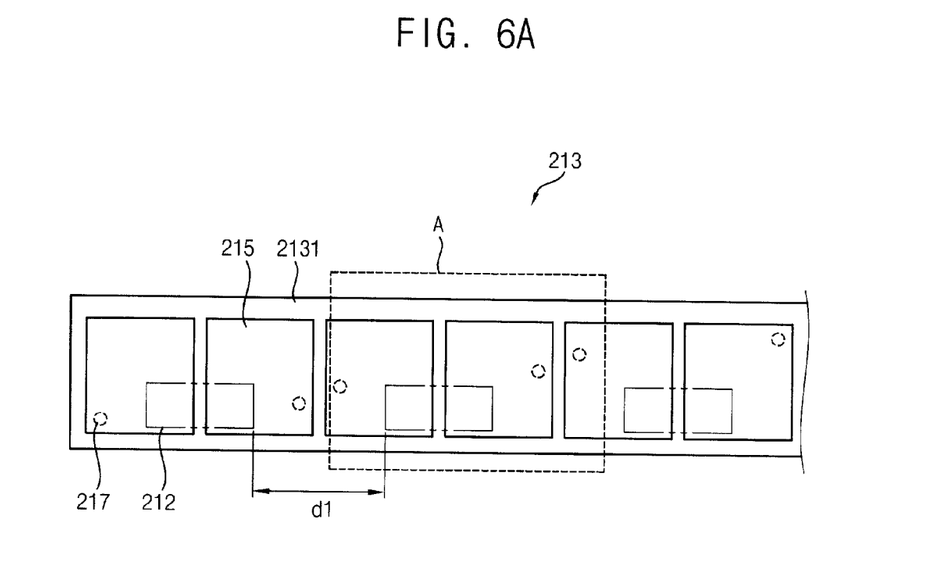
FIGS. 6A to 6C are plan views illustrating a substrate of the light source assembly in FIG. 5.
Figure 6B:
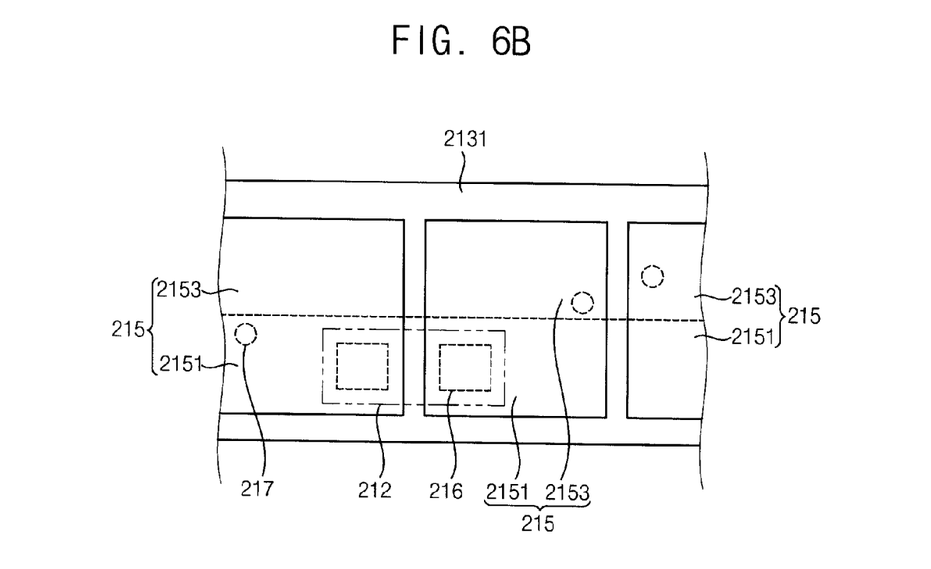
Figure 6C:
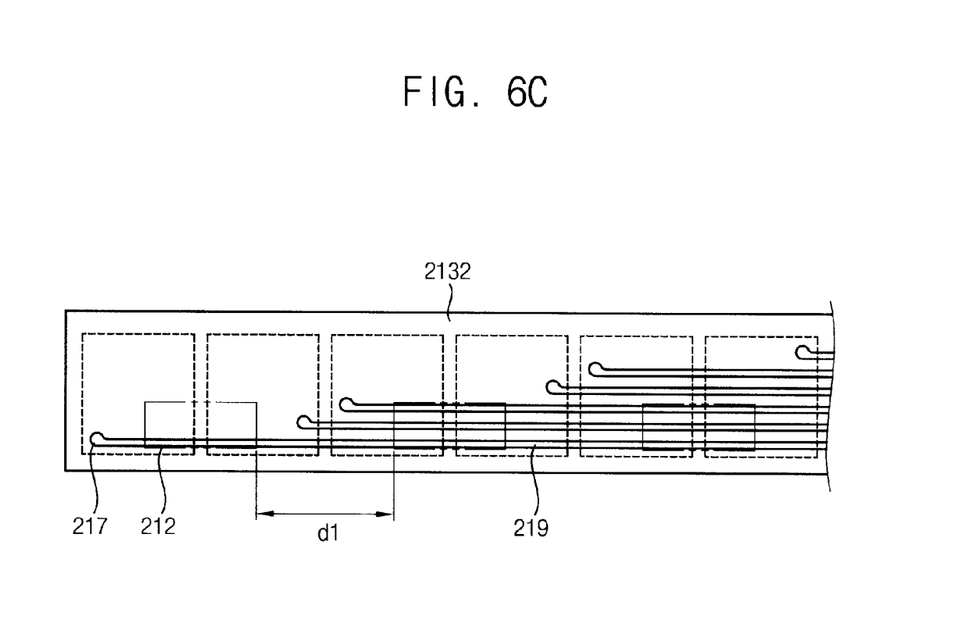

FIGS. 6A to 6C are plan views illustrating the substrate of the light source assembly in FIG. 5. FIGS. 6A and 6B are plan views illustrating the first surface 2131, and the FIG. 6C is a plan view illustrating second surface 2132. FIG. 6B is an enlarged plan view of an area 'A' of the substrate in FIG. 6A.

In the present example embodiment, the substrate 213 includes a first surface 2131, a second surface 2132 and a plurality of connecting parts 217. The first surface 2131 includes a plurality of mounting areas 212 and a plurality of electrode pads 215. The mounting areas 212 are spaced apart from each other by a first distance d1, and each of the light source units is mounted in each of the mounting areas 212. Each of the electrode pads 215 includes a contact part 216 and a first electrode pad 2151. The contact part 216 is partially overlapped with each of the mounting areas 212 and is electrically connected to the light source unit for supplying electricity when the light source unit is mounted. The first electrode pad 2151 is extended toward the contact part 216.

Referring to FIG. 6B, each of the electrode pads 215 may include a second electrode pad 2153, which is extended in a direction substantially perpendicular to a longitudinal direction of the first surface 2131. A portion of the connecting parts 217 may be formed on the second electrode pads 2153. When the first electrode pads 2151 is insufficient for spaces in which the connecting parts 217 are formed, the second electrode pads 2153 supplies extra spaces for the connecting parts 217.

Referring to FIG. 6C, the second surface 2132 includes a plurality of wirings 219. Conventionally, the wirings may not be formed in areas corresponding to the mounting areas. In the present example embodiment, the wirings 219 may be formed in the areas corresponding to the mounting areas 212 since the connecting part 217 is formed in side areas of the mounting areas 212. For example, conventionally, the connecting part may not be formed in the mounting area in which the light source unit is mounted since the contact part is formed in the mounting area. In the present example embodiment, the electrode pads 215 include the first electrode pad 2151 and the second electrode pad 2153 and are formed widely on the first surface 2131, and thus the wirings may be formed in the areas of the second surface 2132 corresponding to the mounting areas 212, using the second electrode pads 2153.

The connecting parts 217 may be formed in the entire area of the second substrate 213, and thus the wirings 219 may be formed in the entire area of the second surface 2132 of the second substrate 213. Thus, the wirings may be formed in the areas of the second surface 2132 of the substrate 213 corresponding to the mounting area 212, and the width of the substrate 213 may be reduced.

Figure 7:
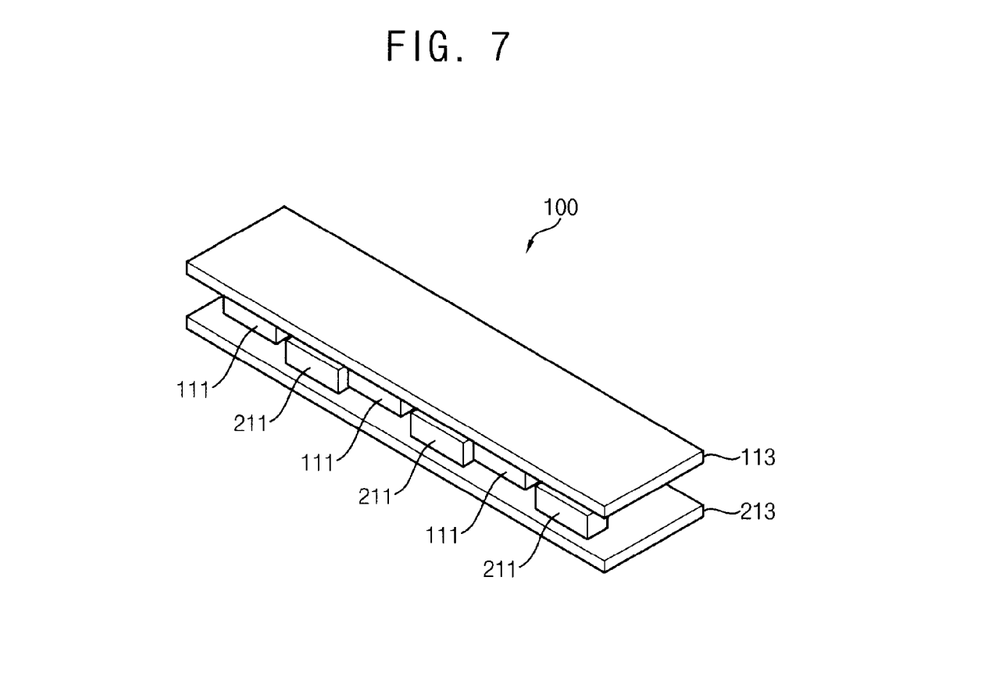
FIG. 7 is a perspective view illustrating the light source assembly combined with the substrate in FIGS. 6A to 6C.

FIG. 7 is a perspective view illustrating a light source assembly with the substrate in FIGS. 6A to 6C.

As described the above, the first substrate 113 and the second substrate 213 include substantially the same elements. The first substrate 113 includes a plurality of first light source units 111, and the second substrate 213 includes a plurality of second light source units 211. The first light source units 111 are disposed in separate spaces between the second light source units 211, and the second light source units 211 are disposed in separate spaces between the first light source units 111, respectively. When the first substrate 113 and the second substrate 213 are overlapped, the light source units are disposed like a plurality of light sources disposed at one substrate without gaps between adjacent light source units. The first light source units 111 may include a light source different from the second light source units 211, and thus the light brightness is adjusted by separately driving the first light source units and the second light source units when the light source assembly controls the supplied light.

Moreover, an additional reflective pattern may be formed on a surface of the first substrate and a surface of the second substrate, and thus the light is prevented from leaking and the efficiency of the light supply may be improved.

Figure 8A:
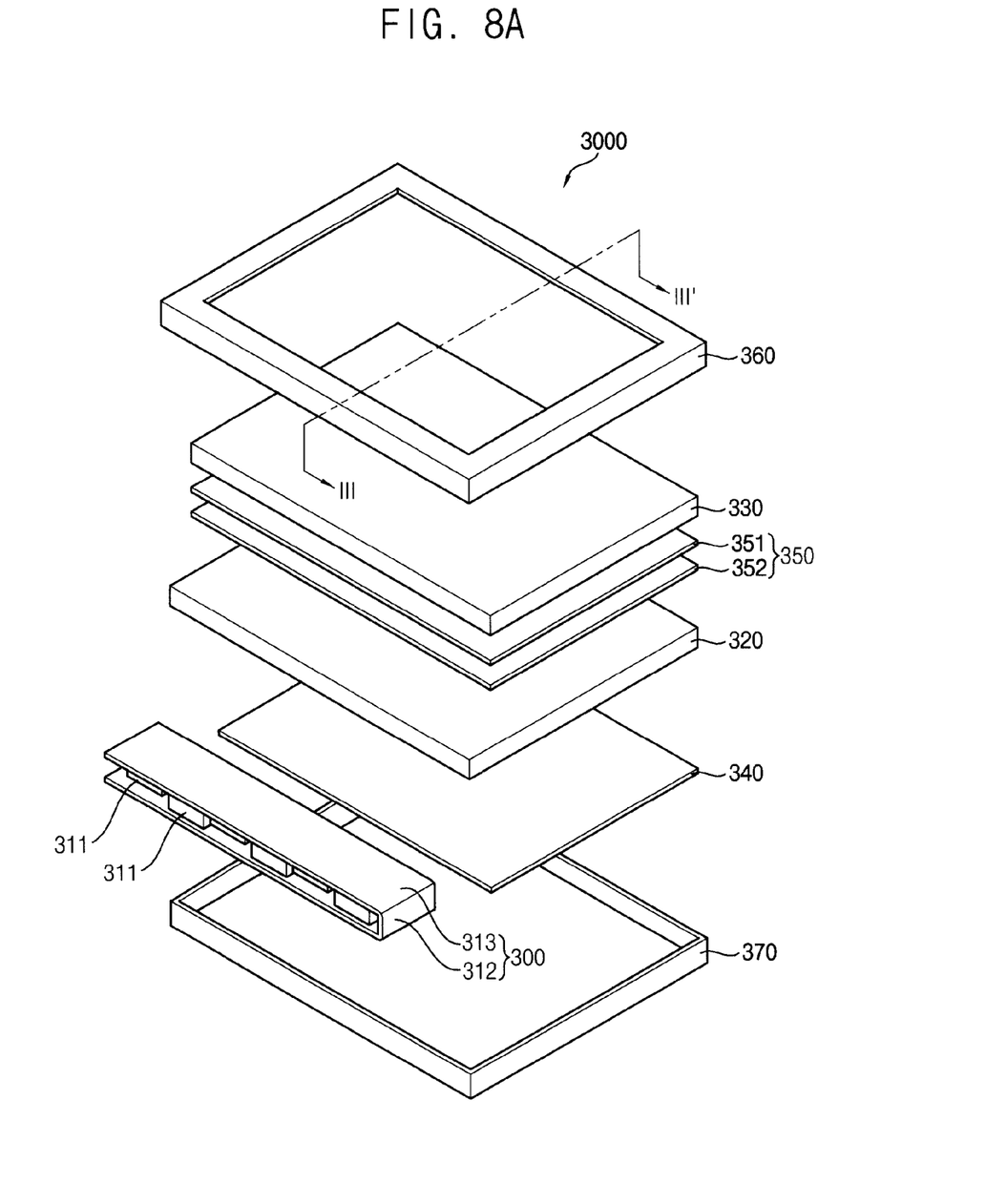
FIG. 8A is a exploded perspective view illustrating a display apparatus having a light source assembly according to still another embodiment.
Figure 8B:
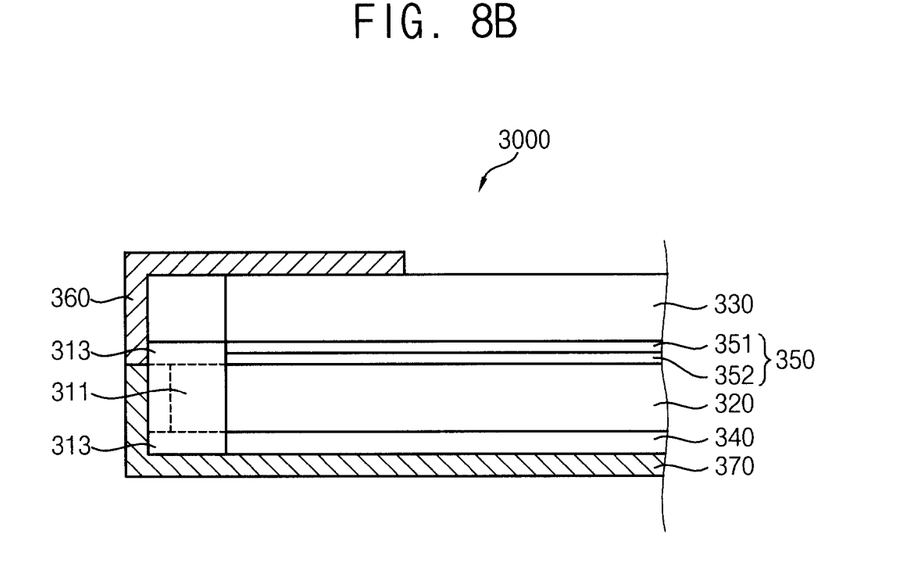
FIG. 8B is a cross-sectional view taken along a line III-III' of FIG. 8A.

FIG. 8A is an exploded perspective view illustrating a display apparatus having a light source assembly according to a still another embodiment. FIG. 8B is a cross-sectional view taken along a line III-III'.

Referring to FIGS. 8A and 8B, a display apparatus 3000 according to the present example embodiment includes an upper mold 360, a display panel 330, an optical sheet 350, a light guide plate 320, a reflective plate 340, a light source assembly 300 and a lower mold 370. The light generated by the light source assembly 300 is guided toward the display panel 330 by the light guide plate 320 and the reflective plate 340. The image is displayed on the display panel 330 using the guided light. The display apparatus of the present example embodiment is substantially the same as the display apparatus in FIGS. 4A to 4B except for the light source assembly 300.

Referring to FIG. 8B, a portion of the light guide plate 320 is surrounded by the substrate 313 of the light source assembly 300. The light source assembly 100 in FIG. 4B includes two substrates, but the light source assembly of the present example embodiment includes one foldable substrate. The light source assembly 300 includes one substrate and the substrate may be folded at a bending part 312. The width of the substrate is too small, and thus the margin of the non-displaying area is reduced and the display apparatus is manufactured with a sufficiently small size. Moreover, the light source assembly 300 may be formed with one substrate, and thus the number of components may be reduced and the manufacturing process may be simplified.

Figure 9:
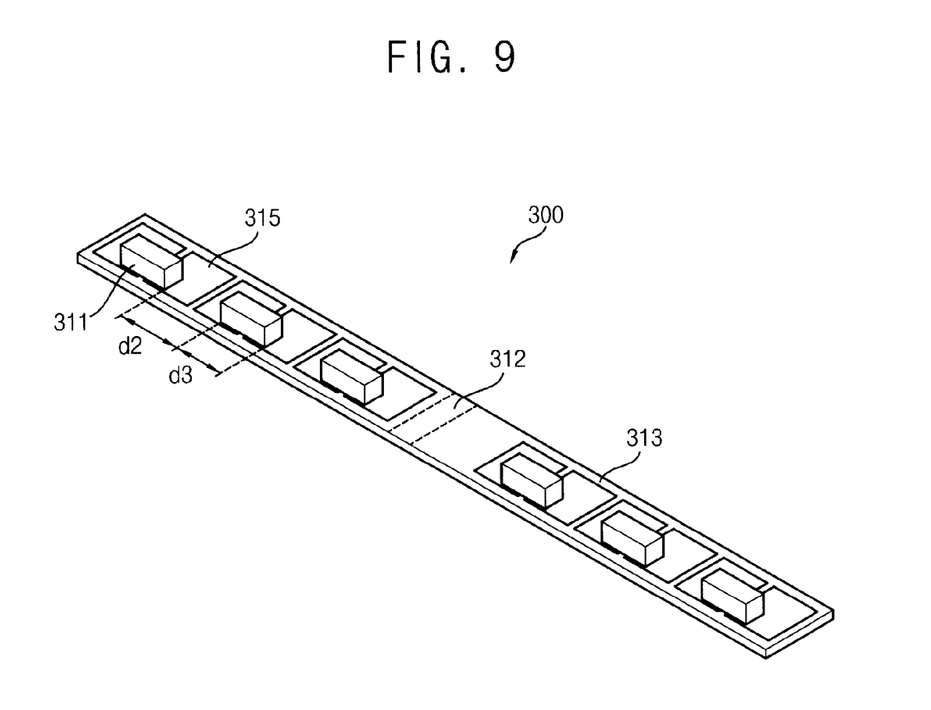
FIG. 9 is a perspective view illustrating the light source assembly in FIG. 8A.
Figure 10:
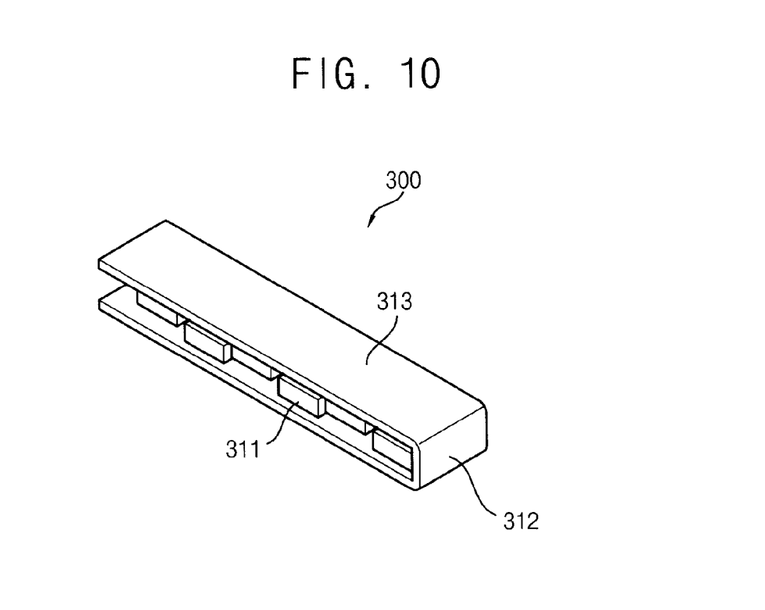
FIG. 10 is a perspective view illustrating the assembled light source assembly in FIG. 9.

FIG. 9 is a perspective view illustrating the light source assembly in FIG. 8A. FIG. 10 is a perspective view illustrating the assembled light source assembly in FIG. 9.

A light source assembly 300 in the present example embodiment includes one substrate 313. The light source assembly 300 includes a plurality of light source units 311, a substrate 313 and a bending part 312. A plurality of electrode pads 315 are formed on a first surface of the substrate 313, and a plurality of wirings are formed on a second surface of the substrate 313. The electrode pads 315 and the wirings are electrically connected through connecting parts. The light source assembly 300 of the present example embodiment has substantially the same elements as the light source assembly 100 in FIG. 5 except for the bending part 312.

The light source assembly 300 includes a bending portion 312 disposed at a center of the substrate 313 extended in a longitudinal direction. The bending portion 312 may include a flexible material. Alternatively, the substrate 313 may include a flexible printed circuit board ("FPCB"). Instead of overlapping two substrates with each other, the light source assembly 300 of the present example embodiment is formed by folding one substrate. The plurality of light source units 311 are spaced apart from each other by a first distance d2.

The first distance d2 is substantially the same as a width d3 of the light source unit 311. Thus, the light source units 311 are disposed adjacent to each other without gaps between the light source units 311 when the substrate 313 is folded. The width of the substrate may be reduced and the light source units may be disposed without the gaps between the light source units 311.

Figure 11:
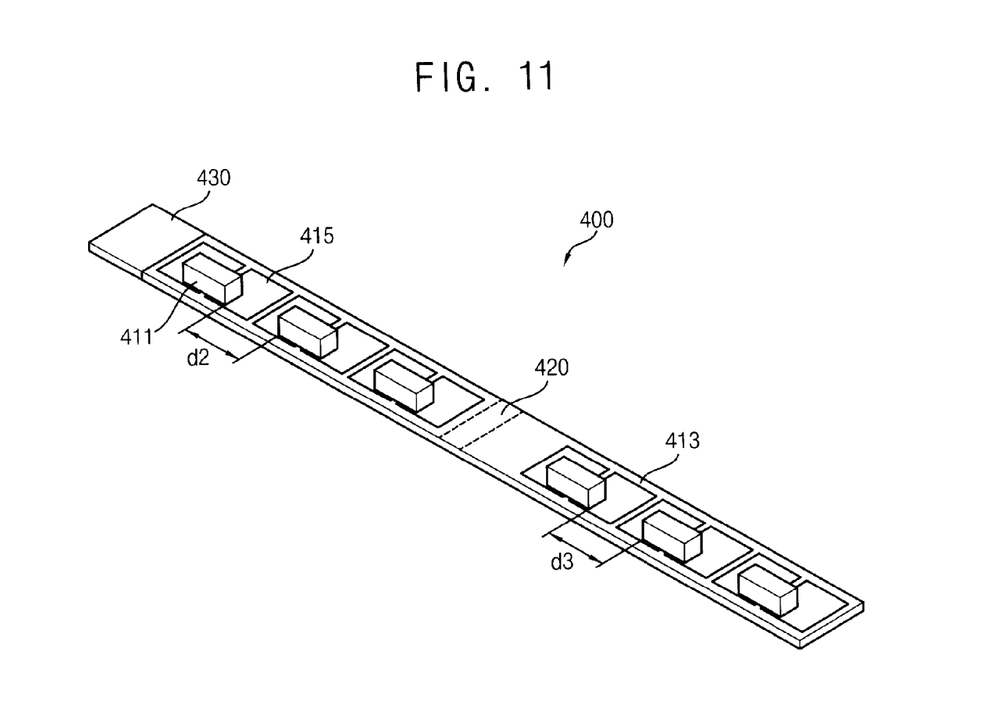
FIG. 11 is a exploded perspective view illustrating a light source assembly according to still another embodiment.
Figure 12:
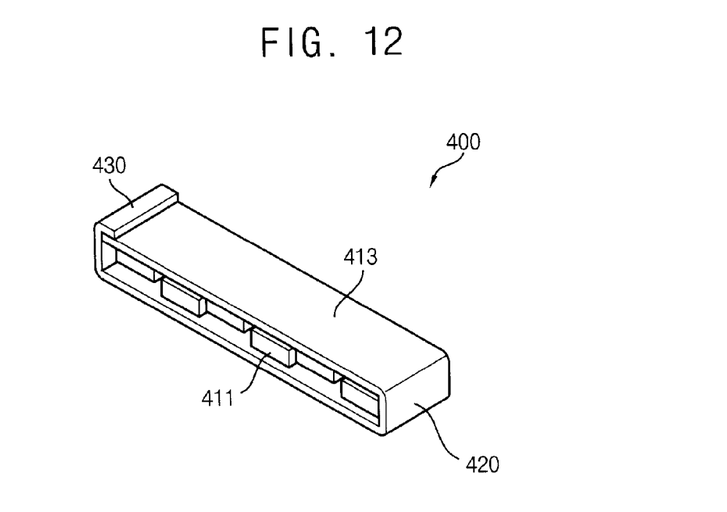
FIG. 12 is a perspective view illustrating the assembled light source assembly in FIG. 11.

FIG. 11 is an exploded perspective view illustrating a light source assembly according to a still another embodiment. FIG. 12 is a perspective view illustrating the assembled light source assembly in FIG. 11.

The light source assembly 400 includes a plurality of light source units 411, a substrate 413, a bending part 420, and a light blocking part 430. The light source assembly 400 includes substantially the same elements as the light source assembly 300 in FIG. 9 except for the light blocking part 430.

Referring to FIGS. 11 and 12, the light blocking part 430 is extended from the substrate 413 in the longitudinal direction of the substrate 413. The light blocking part 430 prevents the light of the light source units 411 from leaking to a side of the light source assembly 400. When the entire of the substrate 413 includes the FPCB, the substrate 413 may include the light blocking part by further extending the substrate 413 without additional components or additional manufacturing process. A connecting portion of the light blocking part 430 to the substrate 413 may be adhered using an extra adhesion material or an adhesive tape. Thus, the light source assembly may be formed by one FPCB substrate.

As mentioned above, the wirings may be formed on the entire surface of the substrate by extending the electrode pads. Thus, the width of the substrate is reduced. The margin of the non-displaying area is formed relatively smaller, and the number of the light source units is increased in the limited spaces. Thus, a relatively smaller display apparatus may be designed.

Moreover, conventionally, the high brightness light source units are used for implementing the high brightness in the limited spaces. In contrast, the light source units described herein are disposed without gaps therebetween, and thus the number of light source units may be disposed more in the limited spaces. As such, high brightness may be achieved without adding the expensive high-brightness light source units.

Moreover, one substrate surrounds the entire of the light source assembly, and thus the light leaking may be prevented. Thus, the efficiency of the light may be more enhanced.

The foregoing is illustrative and is not to be construed as limiting thereof. Although a few example embodiments have been described, those skilled in the art will readily appreciate in view of the foregoing that many modifications are possible in the example embodiments without materially departing from the novel teachings and advantages disclosed herein. Accordingly, all such modifications are intended to be included within the scope of the disclosed subject matter. In the claims, means-plus-function clauses are intended to cover the structures described herein as performing the recited function and not only structural equivalents but also functionally equivalent structures. Therefore, it is to be understood that the foregoing is illustrative and is not to be construed as limited to the specific example embodiments disclosed, and that modifications to the disclosed example embodiments, as well as other example embodiments, are intended to be included within the scope of the present teachings.

What is claimed is:

1. A light source assembly comprising:
a first substrate, elongated along a first longitudinal direction;
a plurality of first light source units mounted on the first substrate one successively after the next along the first longitudinal direction and spaced apart from each other by a first distance;
a second substrate also elongated along the first longitudinal direction;
a plurality of second light source units mounted on the second substrate one after the next along the first longitudinal direction and spaced apart from each other by a second distance, wherein the first substrate is disposed proximate to and parallel to the second substrate such that each of a subset of the second light source units is disposed between a corresponding successive pair of the first light source units that are mounted on the first substrate one successively after the next;
a bending part extending in a direction other than the first longitudinal direction and be formed between the first and second substrates and connecting a first longitudinal end of the first substrate with a corresponding first longitudinal end of the second substrate; and
a light blocking part extended from a second longitudinal end of the second substrate and along a direction other than the first longitudinal direction to a corresponding second longitudinal end of the first substrate and wherein at least the light blocking part provides a light blocking function that blocks light of the first and second light source units from leaking out from a side region of the light source assembly that is adjacent to the second longitudinal ends of the first and second substrates.

2. The light source assembly of claim 1,
wherein the first and second light source units comprise light emitting diodes (LEDs).

3. The light source assembly of claim 1,
wherein the first substrate comprises a first surface having a plurality of first electrode pads extending in a first direction, a second surface having a plurality of first wirings overlapping with the first light source units, and a plurality of first connecting parts electrically connecting the first wirings to the first electrode pads respectively, and
wherein the second substrate comprises a third surface having a plurality of second electrode pads extending in the first direction, a fourth surface having a plurality of second wirings overlapping with the second light source units, and a plurality of second connecting parts electrically connecting the second wirings to the second electrode pads respectively.

4. The light source assembly of claim 3,
wherein the first and second connecting parts comprise holes.

5. The light source assembly of claim 3, further comprising reflective patterns formed on the first surface of the first substrate and the third surface of the second substrate.

6. The light source assembly of claim 3, further comprising:
a plurality of third electrode pads formed on the first surface of the first substrate and extending in a second direction substantially perpendicular to the first direction;
a plurality of third wirings formed on the second surface of the first substrate, and not overlapping with the first light source units;
a plurality of fourth electrode pads formed on the third surface of the second substrate and extending in the second direction;
a plurality of fourth wirings formed on the fourth surface of the second substrate, and not overlapping with the second light source units;
a plurality of third connecting parts penetrating the first and second surfaces of the first substrate and connecting the third electrode pads with the third wirings respectively; and
a plurality of fourth connecting parts penetrating the third and fourth surfaces of the second substrate and connecting the fourth electrode pads with the fourth wirings respectively.

7. The light source assembly of claim 6,
wherein the third and fourth connecting parts comprise holes.

8. The light source assembly of claim 1,
wherein the first light source units and the second light source units comprise side view-type LEDs.

9. The light source assembly of claim 1,
wherein a maximum brightness of the first light source units is different from a maximum brightness of the second light source units.

10. The light source assembly of claim 1,
wherein the first distance is substantially the same as a width of the second light source unit, and
the second distance is substantially the same as a width of the first light source units.

11. The light source assembly of claim 1,
wherein the first substrate, the bending part and the second substrate are integrally formed to be one body.

12. A backlight assembly comprising:
a light source assembly having a first substrate, elongated along a first longitudinal direction, a plurality of first light source units mounted on the first substrate one successively after the next along the first longitudinal direction and spaced apart from each other by a first distance, a second substrate also elongated along the first longitudinal direction, a plurality of second light source units mounted on the second substrate one after the next along the first longitudinal direction, each of the second light source units being disposed between the first light source units adjacent to each other, a bending part formed between the first and second substrates and connecting a first longitudinal end of the first substrate with a corresponding first longitudinal end of the second substrate, and a light blocking part extended from a second longitudinal end of the second substrate and along a direction other than the first longitudinal direction to a corresponding second longitudinal end of the first substrate, wherein at least the light blocking part provides a light blocking function that blocks light of the first and second light source units from leaking out from a side region of the light source assembly that is adjacent to the second longitudinal ends of the first and second substrates; and
a light guide plate disposed adjacent to the light source assembly.

13. The backlight assembly of claim 12,
wherein the light guide plate partially overlaps with the first substrate and the second substrate of the light source assembly.

14. The backlight assembly of claim 12,
wherein the first light source units and the second light source units comprise side view-type LEDs.

15. The backlight assembly of claim 12,
wherein the first substrate, the bending part and the second substrate are integrally formed to be one body.

16. The backlight assembly of claim 12,
wherein the first distance is substantially the same as a width of the second light source units.

\* \* \* \* \*